US007120980B1

(12) United States Patent
Chang

(10) Patent No.: US 7,120,980 B1
(45) Date of Patent: Oct. 17, 2006

(54) PIPE DISASSEMBLING TOOL

(76) Inventor: Hsueh Chin Chang, 5F.-2, No.212, Sec. 1, Wunsin Rd., Taichung City (408) (TW)

( * ) Notice: Subject to any disclaimer, the term of this patent is extended or adjusted under 35 U.S.C. 154(b) by 0 days.

(21) Appl. No.: 11/176,933

(22) Filed: Jul. 6, 2005

(51) Int. Cl.
*F16L 35/00* (2006.01)

(52) U.S. Cl. .......................................... 29/237; 29/268

(58) Field of Classification Search .................. 29/268, 29/267, 237, 238, 239, 272, 270; 299/99.1, 299/99.2, 33; 81/302, 3.8, 13, 53.11, 429.5, 81/427; 7/125, 126
See application file for complete search history.

(56) References Cited

U.S. PATENT DOCUMENTS 4,571,808 A * 2/1986 King .......................... 29/268
5,226,230 A * 7/1993 Klinger ...................... 29/237

* cited by examiner

*Primary Examiner*—Robert C. Watson

(57) ABSTRACT

A pipe disassembling tool includes a first arm and a second arm pivotally connected with each other by a pin. The first arm and the second arm respectively have a first connecting portion and a second connecting portion formed on a first end of each of the first arm and the second arm. A torsion spring is sleeved on the pin and has two opposite ends respectively abutting against the first arm and the second arm to make the first arm and the second arm abut each other when the tool is in an original condition. A first disassembling portion is formed on a second end of the first arm and a second disassembling portion is formed on a second end of the second arm for user to detach the pipe.

2 Claims, 6 Drawing Sheets

PIPE DISASSEMBLING TOOL

BACKGROUND OF THE INVENTION

1. Field of the Invention

The present invention relates to a disassembling tool, and more particularly to a pipe disassembling tool.

2. Description of Related Art

As well known, a vehicle usually uses pipes to cycle engine oil for lubricating the engine to ensure the engine being operated in a smooth condition. An oil filter is provided to filter the impurities from the used oil for preventing the elements in the engine from being damaged due to the impurities in the used oil. With reference to FIG. 6, the oil filter (40) includes a nozzle (41) longitudinally extending therefrom. A pipe (not numbered) is longitudinally connected to the nozzle (41). A coupling (43) is disposed on a connecting end of the pipe for connecting to the nozzle (41). A buckle (not shown) is mounted in the coupling (3) for engaging to the nozzle (102) and made of resilient material. The buckle engaged into an outer periphery of the nozzle (41) to prevent the pipe (2) from being reversely detached from the nozzle (41) when the coupling (43) is sleeved on the nozzle (41).

However, the assembled pipe frequently needs to be replaced when being broken. In addition, the assembled pipe needs to be detached from the nozzle (41) when the oil filter (40) needs to be replaced. The buckle must be disengaged from the outer periphery of the nozzle (41). The coupling (43) may be broken when the pipe is detached from the nozzle (41) by force before buckle be disengaged from the nozzle (41). Consequently, a pipe disassembling tool is marketed for operator to conveniently disengage the buckle from the nozzle (41).

A conventional pipe disassembling tool in accordance with the prior art shown in FIG. 6 comprises a first arm (50) and a second arm (60) each having a first end (52/62) pivotally mounted to each other by a pivot (70) and a second end having a curved protrusion (51/61) extending from the second end of each of the first arm (50) and the second arm (60). A rubber band (72) is sleeved on a middle portion of the conventional pipe disassembling tool.

When operating the conventional pipe disassembling tool, the nozzle (41) is surrounded with the two curved protrusions (51, 61). The two curved protrusions (51, 61) are inserted into the coupling (43) to push the buckle for making the buckle be disengaged from the nozzle (41) after the operator inward pressing the first arm (50) and the second arm (60). As a result, the operator can longitudinally detaching the pipe with the coupling (43) from the nozzle (41) of the oil filter (40).

However, the conventional pipe disassembling tool has several disadvantages as follow.

1. The user needs to outwardly pull the first arm (50) and the second arm (60), and resist the elasticity of the rubber band (72) for making the two curved protrusions (51, 61) surrounding the nozzle (41) with two hands. It is laborious.

2. The two first ends (52, 62) of the first arm (50) and the second arm (60) are pivoted on each other, and the two second ends of the first arm (50) and the second arm (60) respectively having a curved protrusion (51/61) extending therefrom such that the first end (52/62) and the second end of each of the two arms (50, 60) are inconveniently forced.

3. The rubber band (72) is exposed such that the rubber band (72) may be deteriorated due to operating temperature.

The present invention has arisen to mitigate and/or obviate the disadvantages of the conventional pipe disassembling tool.

SUMMARY OF THE INVENTION

The main objective of the present invention is to provide an improved pipe disassembling tool that is conveniently operated.

To achieve the objective, the pipe disassembling tool in accordance with the present invention comprises a first curved arm having a first connecting portion formed on a first end thereof. The first connecting portion has a first press portion formed on a distal end of the first connecting portion and a first disassembling portion formed on a second end of the first curved arm. A first operating portion is formed on an outside wall of the first connecting portion for user to operating the pipe disassembling tool. A second curved arm is pivotally connected with the first curved arm by a pin. The second curved arm has a structure corresponding to that of the first curved arm. The second curved arm has a second connecting portion formed on a first end thereof. The second connecting portion has a second press portion formed on a distal end of the second connecting portion and a second disassembling portion formed on a second end of the second curved arm. A second operating portion is formed on an outside wall of the second connecting portion for user to operating the pipe disassembling tool. The first operating portion, the second operating portion and the pin linearly correspond to one another. A torsion spring is sleeved on the pin and has two opposite ends respectively abutting against the first curved arm and the second curved arm to make the first curved arm and the second curved arm abut each other when the pipe disassembling tool is in an original condition.

Further benefits and advantages of the present invention will become apparent after a careful reading of the detailed description with appropriate reference to the accompanying drawings.

DETAILED DESCRIPTION OF THE INVENTION

Figure 1:
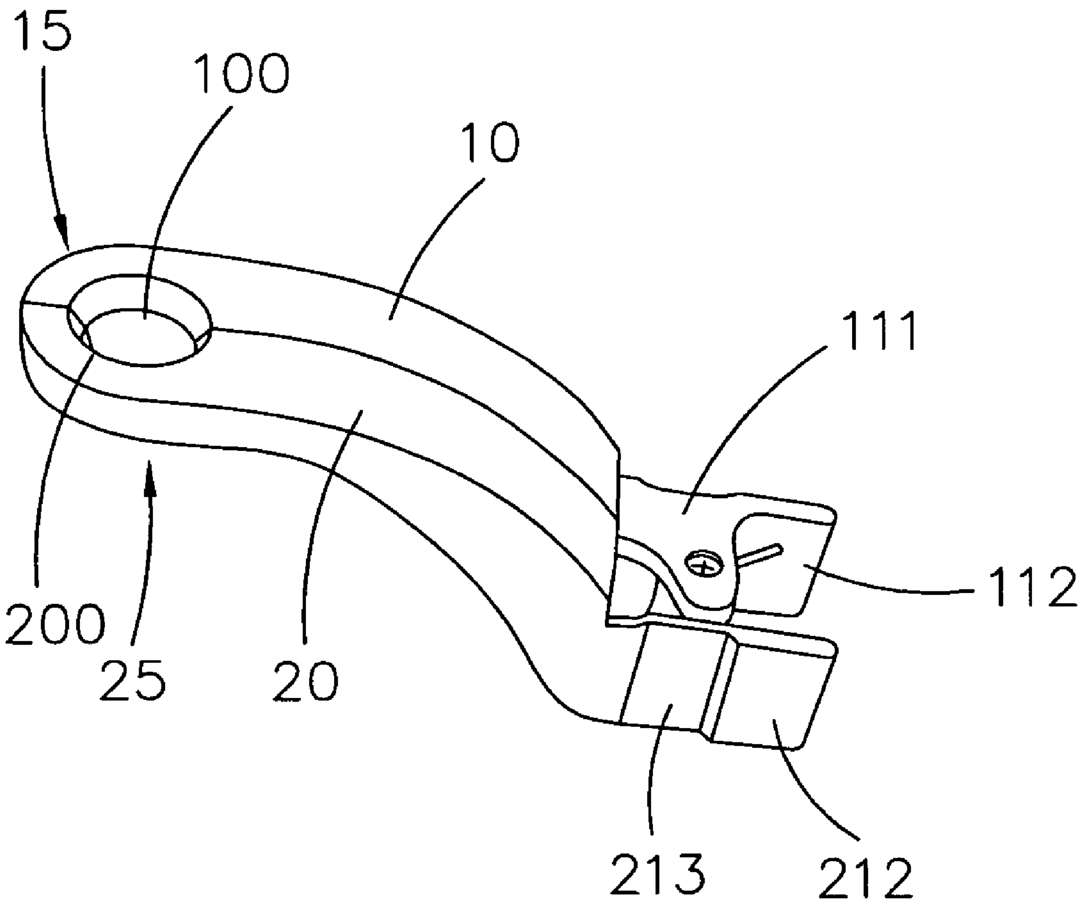
FIG. 1 is a perspective view of a pipe disassembling tool in accordance with the present invention when the first arm and the second arm abut each other.
Figure 2:
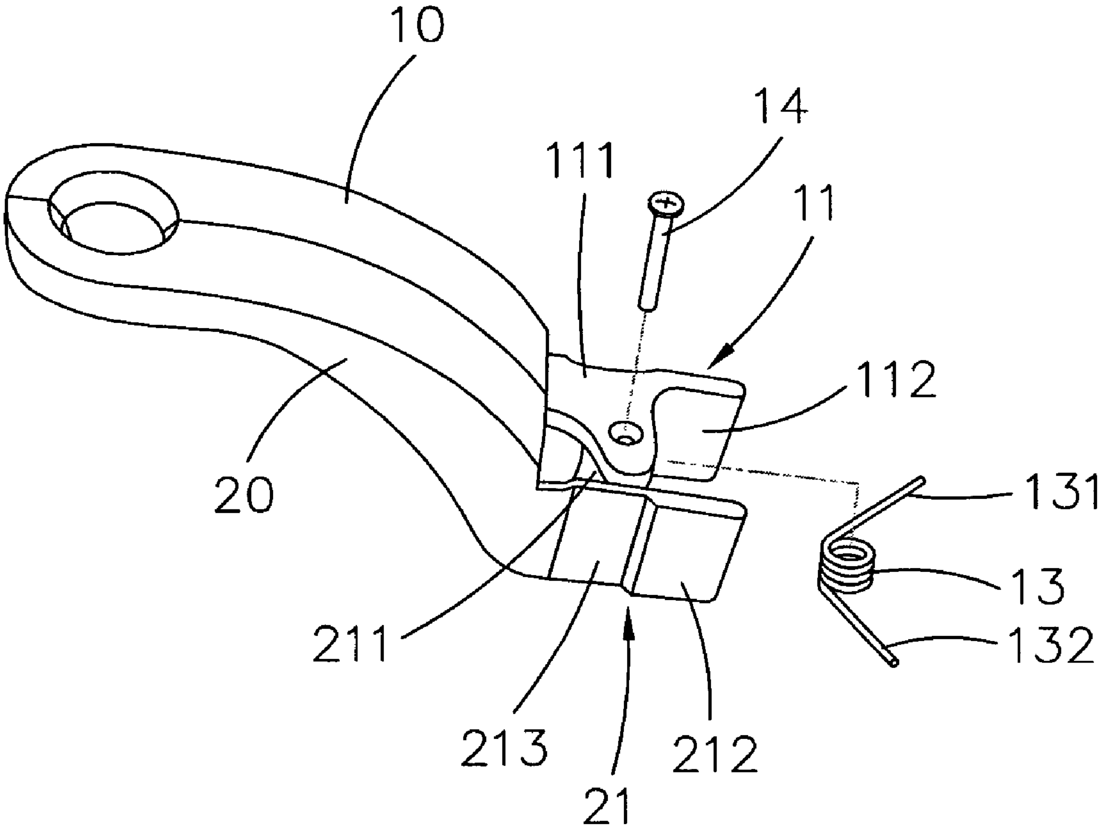
FIG. 2 is a partially exploded perspective view of the pipe disassembling tool in FIG. 1.

Referring to the drawings and initially to FIGS. 1 and 2, a pipe disassembling tool in accordance with the present invention comprises a first arm (10) and a second arm (20) pivotally connected with each other by a pin (14). The first arm (10) and the second arm (20) respectively have a first connecting portion (11) and a second connecting portion (21) formed on a first end of each of the first arm (10) and the second arm (20). A torsion spring (13) is sleeved on the pin (14) and has two opposite ends respectively abutting against the first arm (10) and the second arm (20) to make the first arm (10) and the second arm (20) abut each other when the present invention is in an original condition.

Figure 3:
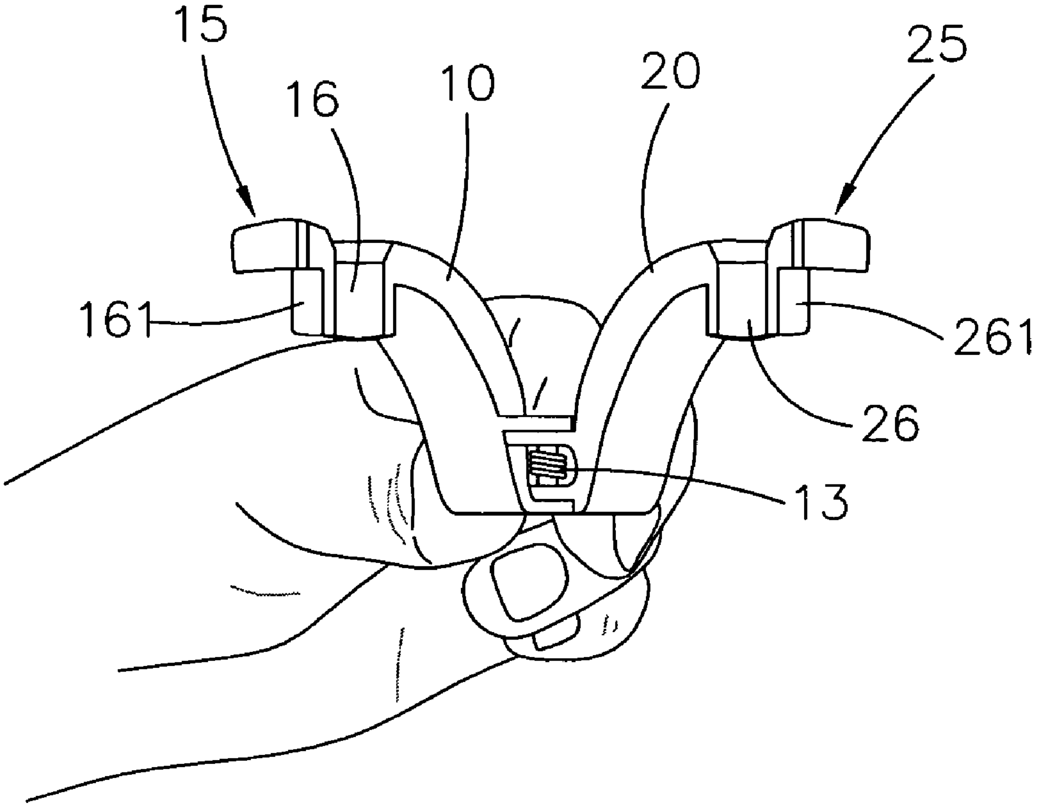
FIG. 3 is a perspective view of a pipe disassembling tool in accordance with the present invention when the first arm and the second arm are outwardly operated.
Figure 4:
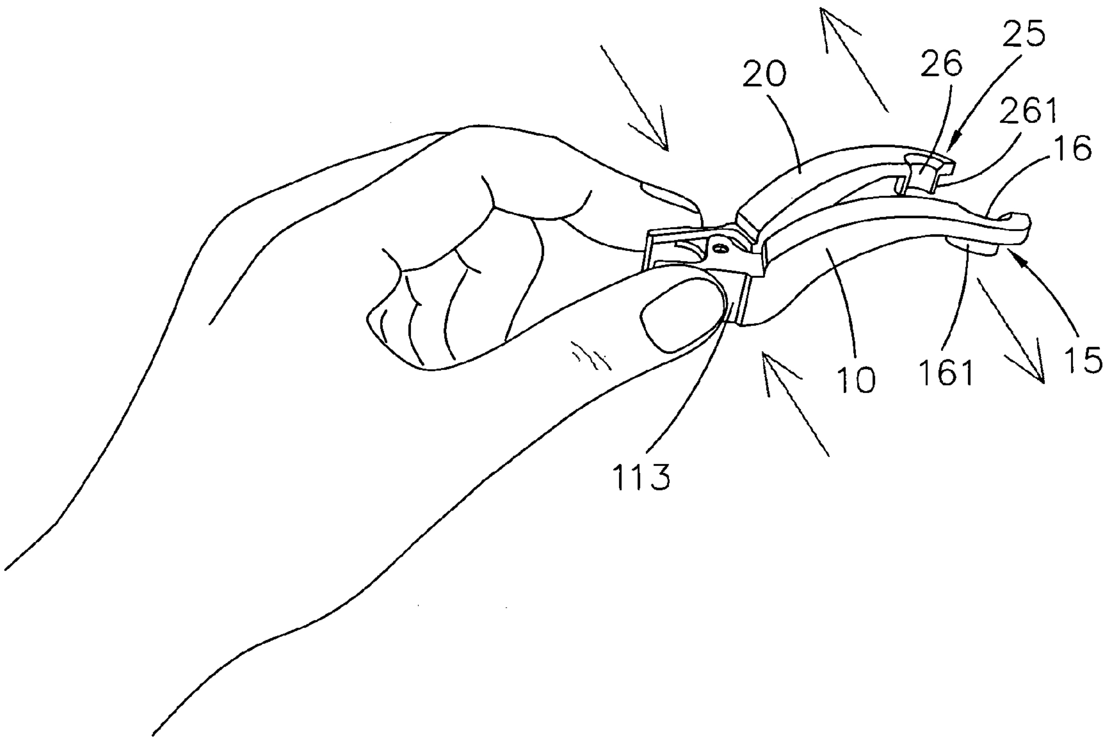
FIG. 4 is a first operational view of the pipe disassembling tool of the present invention.

Further with reference to FIGS. 3 and 4, the structures of the first arm (10) and the second end (20) correspond to each other. The first arm (10) has a first press portion (112) formed on a distal end of the first connecting portion (11) and a disassembling portion (15) formed on a second end of the first arm (10). Relatively, the second arm (20) has a second press portion (212) and a second disassembling portion (25) respectively corresponding to the first press portion (112) and the first disassembling portion (15).

The first arm (10) has a pair of first protrusions (111) laterally extending from the first connecting portion (11) and the second arm (20) has a pair of second protrusions (211) laterally extending from the second connecting portion (21). The pair of first protrusions (111) and the pair of second protrusions (211) are overlapped and the pin (14) extends through the pair of first protrusions (111) and the pair of second protrusions (211). The torsion spring (13) is located between the pair of first protrusions (111) and the pair of second protrusions (211) and the two opposite ends of the torsion spring (13) respectively abut against an inside wall of each of the first press portion (112) and the second press portion (212) to make the first arm (10) and the second arm (20) abut each other when the present invention is in an original condition. A first operating portion (113) is formed on an outside wall of the first connecting portion (11) and a second operating portion (213) is formed on an outside wall of the second connecting portion (21). The first operating portion (113), the second operating portion (213) and the pin (14) linearly correspond to one another. In the preferred embodiment of the present invention, the first operating portion (113) and the second operating portion (213) are a recess for user to force when operating the pipe disassembling tool of the present invention.

The first disassembling portion (15) has a first semicircle indentation (100) defined therein and the second disassembling portion (25) has a second semicircle indentation (200) defined therein. The first semicircle indentation (100) and the second semicircle indentation (200) communicate with each other to define through hole (not numbered) when the first arm (10) and the second arm (20) abut each other. The first disassembling portion (15) includes a first curved protrusion (161) perpendicularly extending therefrom to define a first semicircle groove (16) that longitudinally communicates with the first semicircle indentation (100). The second disassembling portion (16) includes a second curved protrusion (261) perpendicularly extending therefrom to define a second semicircle groove (26) that longitudinally communicates with the second semicircle indentation (200). Consequently, the first semicircle indentation (100), the first semicircle groove (16), the second semicircle indentation (200) and the second semicircle groove (26) communicate with one another and define a cylindrical passage (not numbered) when the first arm (10) and the second arm (20) abut each other.

Figure 5:
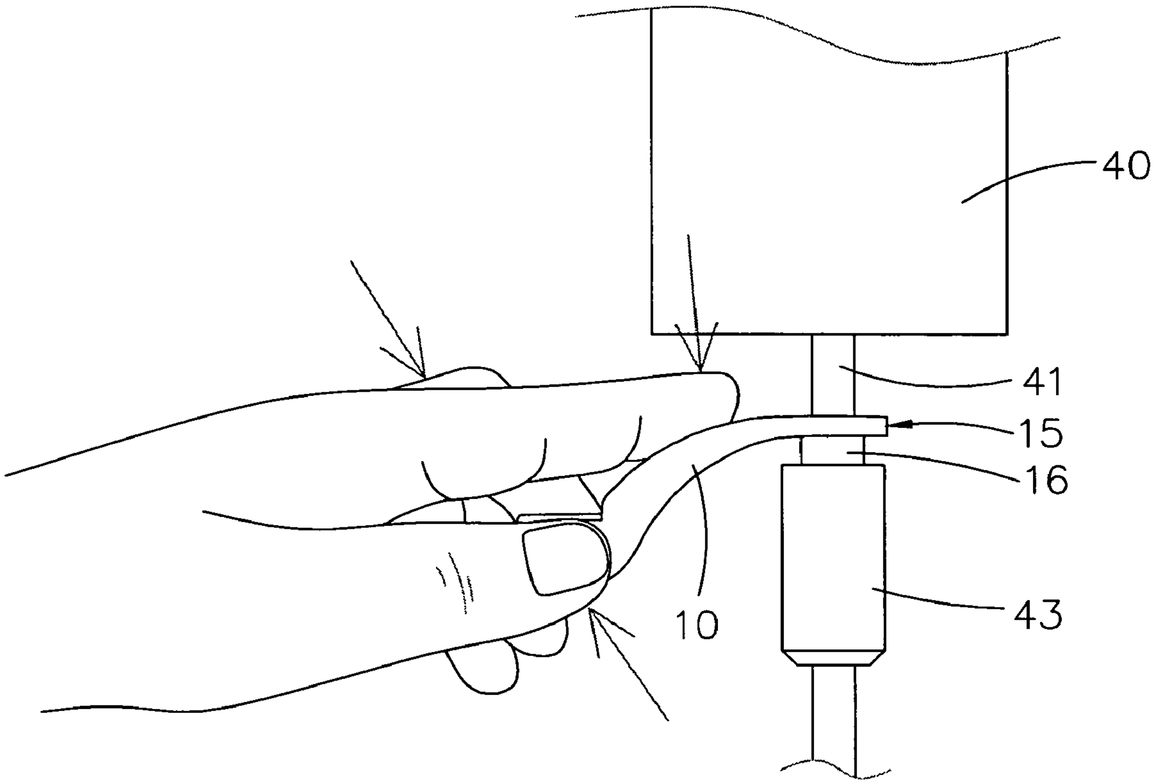
FIG. 5 is a second operational view of the pipe disassembling tool of the present invention.
Figure 6:
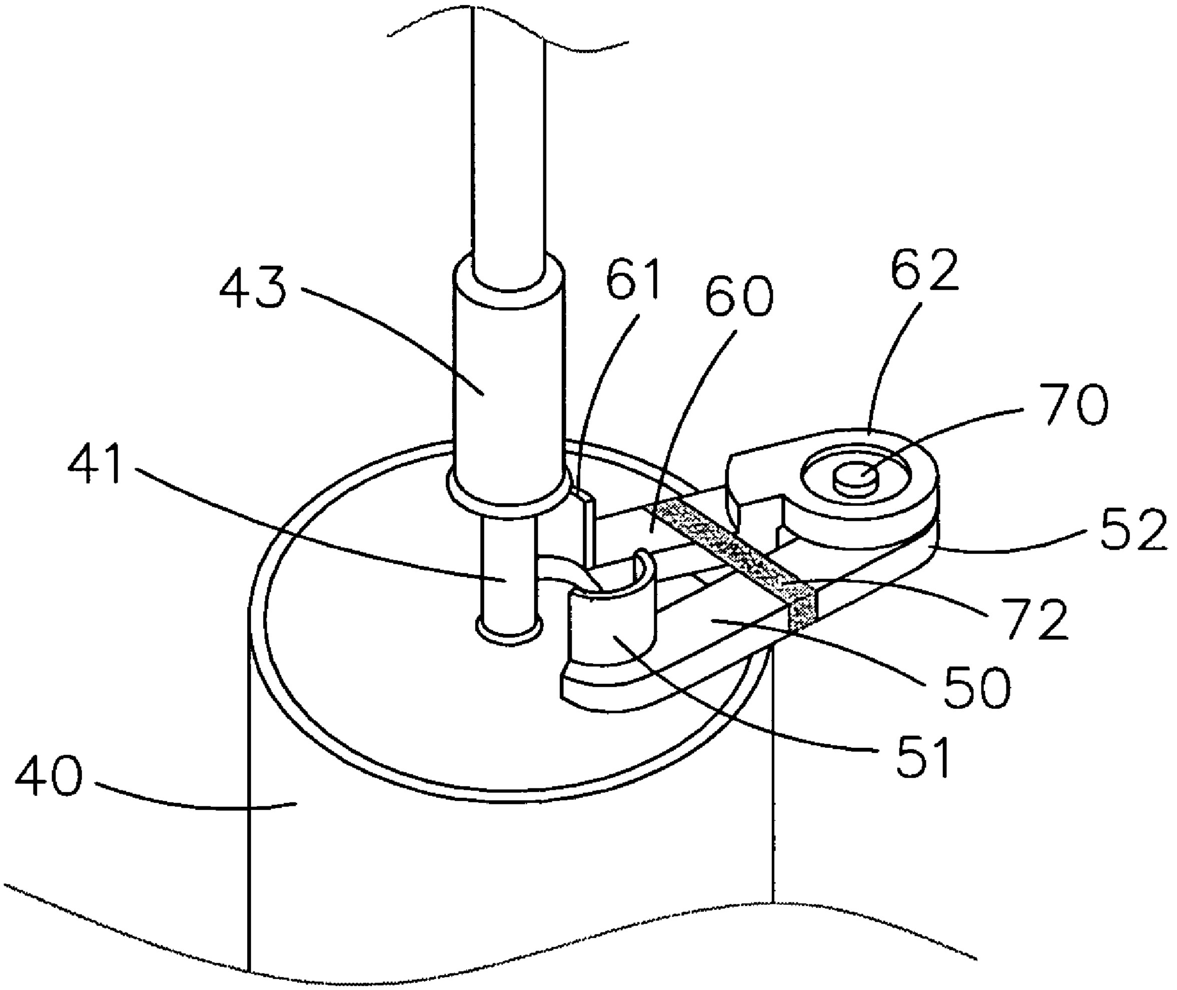
FIG.6 PRIOR ART
FIG. 6 is a perspective operational view of a conventional pipe disassembling tool in accordance with the prior art.

With reference to FIGS. 1, 3 and 4, the operator only needs to use fingers of one hand to press the first press portion (112) and the second press portion (212), thereby the torsion spring (13) is pressed, and the first arm (10) and the second arm (20) are moved relative to each other and the pin (14) is used as a fulcrum. With reference to FIGS. 1, 4 and 5, the operator sets free the first press portion (112) and the second press portion (212) to make the nozzle (41) received in the cylindrical passage due to the restitution force of the torsion spring (13) when the first disassembling portion (15) and the second disassembling portion (16) correspond to the nozzle (41). Then, the user's thumb, middle finger and forefinger respectively press the first operating portion (113), the second operating portion (213) and the top of the first arm (10) and the second arm (20) to make the first semicircle protrusion (161) and the second semicircle protrusion (261) be inserted into the coupling (43) to push the buckle and detach the pipe.

As described above, the pipe disassembling tool in accordance with the present invention includes several advantages as follow.

1. It is convenient to operate. The operator only needs to use one hand to open the first arm (10) and the second arm (20), and press the first operating portion (113), the second operating portion (213) and the top of the first arm (10) and the second arm (20) to detach the pipe.

2. The operator forces on the pipe disassembling tool of the present invention on three points (thumb, middle finger and forefinger) such that the operator can stably hold the tool of the present invention and detach the pipe.

3. The first arm (10) and the second arm (20) are curved such that the pipe disassembling tool can be conveniently operated in the engine chamber that only has a small space.

Although the invention has been explained in relation to its preferred embodiment, it is to be understood that many other possible modifications and variations can be made without departing from the spirit and scope of the invention as hereinafter claimed.

What is claimed is:

1. A pipe disassembling tool comprising:

a first curved arm having a first connecting portion formed on a first end thereof, the first connecting portion having a first press portion formed on a distal end of the first connecting portion and a first disassembling portion formed on a second end of the first curved arm, the first disassembling portion having a first semicircle indentation defined therein and a first curved protrusion perpendicularly extending therefrom to define a first semicircle groove that communicates with the first semicircle indentation, a first operating portion formed on an outside wall of the first connecting portion for user to operating the pipe disassembling tool, the first curved arm having a pair of first protrusions laterally extending from the first connecting portion;

a second curved arm pivotally connected with the first curved arm by a pin, the second curved arm having a structure corresponding to that of the first curved arm, the second curved arm having a second connecting portion formed on a first end thereof, the second connecting portion having a second press portion formed on a distal end of the second connecting portion and a second disassembling portion formed on a second end of the second curved arm, the second disassembling portion having a second semicircle indentation defined therein and communicating with the first semicircle indentation to define a through hole when the first curved arm and the second curved arm abut each other, the second disassembling portion including a second curved protrusion perpendicularly extending therefrom to define a second semicircle groove that communicates with the second semicircle indentation, the first semicircle indentation, the first semicircle groove, the second semicircle indentation and the second semicircle groove communicating with one another and defining a cylindrical passage when the first circle arm and the second curved arm abut each other, a second operating portion formed on an outside wall of the second connecting portion for user to operating the pipe disassembling tool, the first operating portion, the second operating portion and the pin linearly corresponding to one another, the second curved arm having a pair of second protrusions laterally extending from the second connecting portion, the pair of first protrusions and the pair of second protrusions overlapped and the pin extending through the pair of first protrusions and the pair of second protrusions; and a torsion spring sleeved on the pin and located between the pair of first protrusions and pair of second protrusions, the torsion spring having two opposite ends respectively abutting against an inside wall of each of the first press portion and the second press portion to make the first curved arm and the second curved arm abut each other when the pipe disassembling tool us in an original condition.

2. The pipe disassembling tool as claimed in claim 1, wherein the first operating portion and the second operating portion are a recess for use to force when operating the pipe disassembling tool.

* * * * *